United States Patent [19]
Schneider et al.

[11] 3,744,374
[45] July 10, 1973

[54] HYDRAULIC VALVE CONTROL APPARATUS

[75] Inventors: Klaus Schneider, Ludwigsburg; Heinz Flaschar, Aspberg, both of Germany

[73] Assignee: Robert Bosch GmbH, Stuttgart, Germany

[22] Filed: Mar. 13, 1972

[21] Appl. No.: 233,997

[30] Foreign Application Priority Data
   Mar. 17, 1971  Germany .................. P 21 12 813.2

[52] U.S. Cl. .............................. 91/363 R, 91/461
[51] Int. Cl. .......................... F15b 9/03, F15b 9/09
[58] Field of Search ................. 91/461, 420, 363 R, 91/363 A; 137/625.64

[56] References Cited
   UNITED STATES PATENTS

| | | | |
|---|---|---|---|
| 2,644,427 | 7/1953 | Sedgfield et al. | 91/363 R |
| 3,106,084 | 8/1963 | Hoffman et al. | 91/363 R X |
| 3,257,911 | 6/1966 | Garnjost et al. | 91/363 R X |
| 3,370,512 | 2/1968 | McRae | 91/461 X |

*Primary Examiner*—Henry T. Klinksiek
*Assistant Examiner*—Robert J. Miller
*Attorney*—Michael S. Striker

[57] ABSTRACT

A double-acting control piston for shifting the slider body of an operating valve, is movable in a control cylinder, forming first and second chambers in the control cylinder. A high pressure inlet conduit and a low pressure outlet conduit are selectively connected by distributing valve means with the first and second chambers, and an inlet valve, located in the inlet conduit upstream of the distributing valve means, is opened or closed by electric control means for starting and stopping the control piston means.

10 Claims, 2 Drawing Figures

HYDRAULIC VALVE CONTROL APPARATUS

BACKGROUND OF THE INVENTION

The present invention is concerned with an electro-hydraulic control apparatus of the type used for shifting the slider body of an operating valve by which a high pressure fluid inlet and a high pressure fluid outlet are selectively connected to the cylinder of a hydrualic consumer motor.

The U.S. Pat. No. 3,556,154, which is assigned to the same assignee as the present application, discloses an electro-hydraulic control arrangement in which a differential control piston, connected with the slider valve body, is operated by two valves. The annular chamber formed by the control piston at one end of the control cylinder, is connected by a throttle directly with the inlet conduit. Although, this flow of fluid in the inlet conduit can be held at a small amount by a volume limiting valve, the limitation of the flow makes the apparatus unsuitable for certain uses. If in the apparatus of the patent, the valves are held by spring means in closed positions, assuming that the electromagnetic operating means thereof are not energized, it is not possible to return the device to a neutral position when the electric power fails. Furthermore, in the apparatus of the patent, various pressures may occur in the control system due to the flow characteristics of the throttles, while the fluid continuously flows through the system. These pressures are small, but prevent the control piston from arriving in its neutral position. Furthermore, it has been found that in some cases either the required amount of fluid becomes too great, or that the control flow through the open valves becomes excessively high.

SUMMARY OF THE INVENTION

It is an object of the invention to improve an electro-hydraulic control apparatus of the type disclosed in the U.S. Pat. No. 3,556,154, and to avoid the disadvantages thereof.

Another object of the invention is to provide a hydraulic valve control apparatus which requires little voltage, and operates with a small control flow of fluid, without detrimentally affecting the reliability of the apparatus.

With these objects in view, an inlet valve is provided in the inlet conduit means of the apparatus, upstream of distributing valve means which direct the fluid flow into and out of the chambers of the control cylinder and piston means.

In the preferred embodiment, the two chambers formed by the control piston have different effective surfaces, and the chamber having the smaller effective surface is connected to the inlet conduit by the inlet valve, when the same is opened.

In such an arrangement, a flow of fluid from the inlet directly into the low pressure outlet is not possible, irrespective of whether the electric control means of the valves are energized, but not operated, or are disconnected. The flow of control fluid flows only during the setting of the control piston, and requires only so much pressure fluid as is required for operating the differential control piston. Furthermore, the differential control piston can be returned to its neutral position only by the force of a spring, without requiring pressure fluid from the inlet conduit, since additionally required pressure fluid is sucked from the low pressure discharge area. Thereby, the energy losses caused by the control flow of fluid are further reduced. Electric power is only required if the control piston is located outside of its neutral position, and is to be moved. If the electric power fails, the safety circuit permits the return of the control piston to its neutral position. This neutral position is assumed without difficulties, since disturbing pressure due to a continuous control flow of fluid are absent in the hydraulic circuit.

A hydraulic valve control apparatus in accordance with an embodiment of the invention comprises a hydraulic motor including a control cylinder, and a control piston means forming in the control cylinder first and second chambers, which preferably have different effective surfaces; a source of pressure fluid connected with an inlet conduit means; outlet conduit means communicating with a low pressure area; distributing valve means having a neutral position for connecting the first and second chambers with the outlet conduit means, and a plurality of control positions for connecting the inlet and outlet conduit means with selected chambers of the first and second chambers; and inlet valve means in the inlet conduit means upstream of the distributing valve means having a closed position, and an open position in which pressure fluid flows at least partly through the distributing valve means to the first and second chambers for operating the control piston means. Movement of the control piston means can be started and stopped by operation of the inlet valve means.

In one embodiment of the invention, the distributing valve means include first and second distributing valves each of which has an open position and a closed position. The first distributing valve connects the first and second chambers, and the second distributing valve connects the second chamber with the outlet conduit means.

In a second embodiment, the distributing valve means includes a valve cylinder having an inlet port connected with the inlet conduit means and outlet port connected with the outlet conduit means, and two ports connected with each other and with the second chamber. A distributing valve slide in the valve cylinder has a neutral position and first and second control positions. In the neutral position, the connected ports are connected with the inlet and outlet conduit means and in the first and second control positions, the second chamber is connected with the inlet and outlet conduit means, respectively.

The first chamber is annular and has an effective surface smaller than the effective surface of the second chamber, and a spring in the valve cylinder urges the distributing valve slide to neutral position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
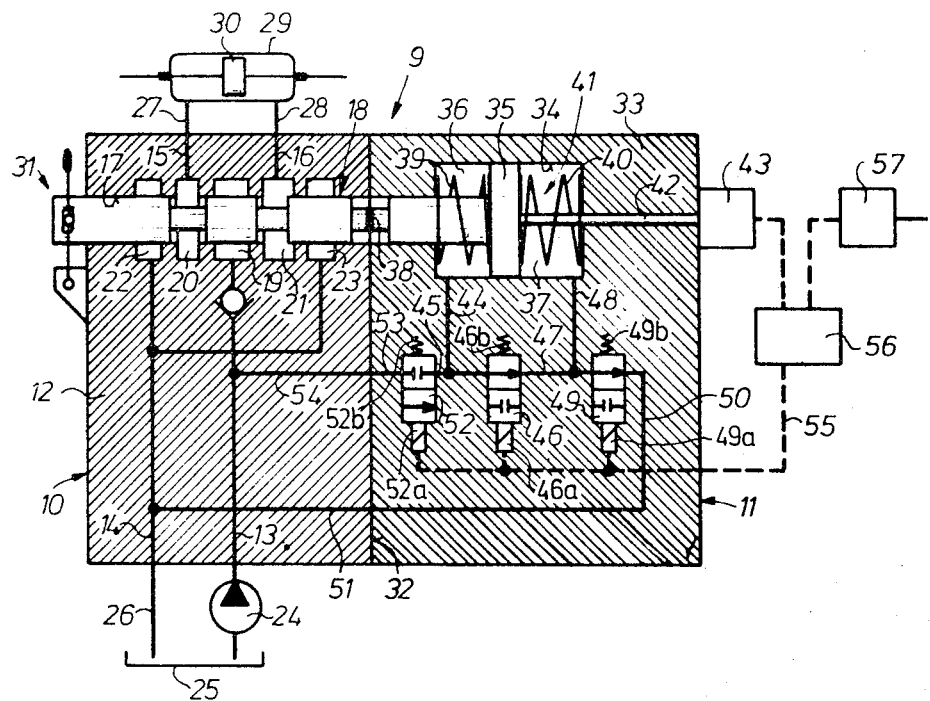
FIG. 1 is a schematic sectional view illustrating a first embodiment of the invention.

The control apparatus shown in FIG. 1 includes an operating valve 10, and a preliminary control unit 11 attached to the housing 12 of the operating valve 10. The housing 12 includes a body having an inlet conduit 13, communicating with a pump 24, an outlet or return conduit 14, connected by discharge conduit 26 with a low pressure reservoir 25, from which pump 24 sucks fluid, a conduit 54 connecting inlet conduit 13 with inlet conduit 53 of control unit 11, and a discharge conduit 51 connecting the outlet conduit 50 of the control unit 11 with the discharge conduit 51, communicating with discharge conduit 14.

A slider valve body is mounted in a cylinder 17 which has an inlet chamber 19, connected by check valve with the inlet conduit 13, two consumer chambers 20 and 21, and two return chambers 22 and 23, communication with outlet conduit 14. Two conduits 15 and 16 connect consumer chambers 20, 21 through consumer conduits 15, 16 with a consumer cylinder and piston motor 29 which has a double-acting piston 30. Manually operated means 31 for setting the valve slider body 18 to a selected position in cylinder 17 are provided in the form of a manual lever pivotally connected with the slider body 18 and pivotally mounted on a fixed bracket of housing 12. This arrangement corresponds substantially to the structure disclosed in the U.S. Pat. No. 3,556,154.

The body 33 of housing 12 is attached to the front surface 32 of housing 12. Housing 33 has a cylinder cavity 34 in which a differential piston 35 is mounted for axial movement. Differential piston 35 has a piston rod coupled at 38 with the slider body 18 for movement together, and on the other side a feeler rod 42, which is much thinner than the piston rod, so that the annular chamber 36 has a smaller effective surface than the chamber 37. Springs 39 and 40 are placed in the first annular chamber 36 and in the second chamber 37, and constitute a return device for the slider body 18, and for the control piston 35, biassing the same to a neutral position illustrated in the drawing.

A device 43 for sensing and representing the actual position of control piston means 35, is operated by the feeler rod 42, and constructed as an inductive pulse generator producing a signal representing the position of the control piston means 35 in the control cylinder 34.

The first annular chamber 36 is connected by an inlet conduit 44 to an inlet valve 52 in accordance with the invention arranged downstream of pump 24, and upstream of the distributing valve means, which, in the embodiment of FIG. 1 include two distributing valves 46 and 49, each of which is shiftable between a closed position position and an open position in the same manner as the inlet valve 52, as schematically indicated in FIG. 1.

Electromagnetic means 52a, 46a, and 49a are connected by a cable 55 with electric control means 56, which effect operation of selected distributing valves 46, 49, and of the inlet valve 52. Valves 52, 46 and 49 are urged to a normal position by springs 52b, 46b, and 49b. In the normal position illustrated in FIG. 1, the inlet conduit 24 is separated by inlet valve 52 from the pump 24, the first annular chamber 36 is connected by inlet conduit portion 44 through distributing valve 46 and conduit portion 48 with the second chamber 37, and by distributing valve 49 with the outlet conduit 50, 51, 26 and to the reservoir 25. Springs 46b and 49b urge the respective distributing valves 46 and 49 to the open position, but when the respective electromagnetic means 46a, 49a are energized, the distributing valves 46, 49 move to the closed position. The inlet valve 52 is closed by spring 52b, but opens when electromagnetic means 52a is energized. As noted above, the actual position representing device 43 generates a signal representing the actual position of control piston means 35, and of the slider valve body 18. The desired position of control piston means 35 can be selected at a desired position representing device 57 which generates by an inductive generator, a signal representing the desired position of control piston means 35 of the slider valve body 18. The two signals are compared in the electric control device 56, as schematically shown by broken lines and the differential signal is supplied to selected wires of cable 55 for effecting shifting of selected valves 52, 46, 49.

The embodiment of FIG. 1 operates as follows:

In the illustrated neutral position of the slider valve body 18, the piston 30 of the consumer motor 29 is hydraulically blocked. The inlet valve 52 closes the inlet conduit 53, while the first and second distributing valves 46 and 49 maintain communication between the first annular chamber and the second chamber 37, and from chamber 37 through distributing valve 49 into the outlet conduit 50, 51. The return device 41 consequently holds the slider valve body 18 securely in its neutral position in which the slider valve portion in inlet chamber 19 prevents flow of fluid from pump 24 into the hydraulic consumer motor 29.

If the desired position representing device 57 is set to a desired new position of control piston means 35, which is different from its actual position as sensed by the actual position representing device 43, the electric control means 56 is actuated by the differential signal, and energizes electromagnetic means 52a to open inlet valve 52, and to close the second distributing valve 49. Pressure fluid from pump 24 and inlet conduit 13, 54 flows through the inlet valve 52 and the first distributing valve 46, and at the same time from the first chamber 36 through the still open first distributing valve 46 into the chamber 37 and presses the differential piston 35, whose effective surface in chamber 36 is smaller than in chamber 37, to the left until the actual position representing device 43 generates a signal representing an actual position corresponding to the desired position set at the device 43. Thereupon the inlet valve 52 is again closed, by de-energizing the respective electromagnetic means 52a, while the second distributing valve 49 remains closed, and the first distributing valve 46 remains open.

The differential control piston 35, and thereby the slider valve body 18 can be stopped in any intermediate position by operation of inlet valve 52 so that the slider valve body 18 can be used for obtaining a variable flow of pressure fluid to the consumer motor 29, in order to influence the direction of movement and speed of piston 30 of hydraulic consumer motor 29.

If the desired position representing device 57 is operated to represent a desired position of the control piston means 35 farther to the left as viewed in FIG. 1, the electronic control means 56 effects opening of the inlet valve 18 so that the flow of pressure fluid flows therethrough and through the first distributing valve 46 and conduit portion 48 into chamber 37 so that control piston means 35 and slider valve body 18 move to the respective left end positions. When these end positions are arrived at, the electronic control means 56, finding identity of the desired position with the actual position of control piston 35, closes again the inlet valve 52.

If the desired position representing device 57 is shifted to a position representing the neutral position of the control piston means 35, the signals generated by the actual position representing device 43 and the desired position representing device 57 are compared in the electronic control means 56 which cause the inlet valve 52 to move to the open position, the first distributing valve 46 to move to the closed position, and the second distributing valve 49 to move to the open position, so that pressure fluid from inlet conduit 13 can flow through the inlet valve 52 into the first annular chamber 36. Since the second chamber 37 in control cylinder 34 is in communication with the outlet conduit 50, 14, the differential control piston means 35 moves to the right, as viewed in FIG. 1, until the position established by the desired position representing device 57 is reached. When this is the case, the control flow from the inlet valve 52 is again interrupted by closing of inlet valve 52, while the first distributing valve 46 remains closed, and the second distributing valve 49 remains open, so that the control piston means 37, together with the slider valve body 18, can be moved by operation of the desired position representing device 57 to any desired intermediate position.

When the slider valve body 18 and the control piston means 35 again arrive in the neutral positions thereof, the inlet valve 52 is closed and the first distributing valve 46 and second distributing valve 49 are opened.

In the same manner as the control piston means 37 and the slider valve body 18 are moved to the left, as described above, the control piston 35 and slider valve body 18 can be moved to the right as viewed in the drawing. During this operation, the inlet valve 52 is always opened when the control flow is required, and during movement to the right, the first dostributing valve 46 and the second distributing valve 49 are open. For stopping control piston means 35 with slider valve body 18, in an intermediate position, the flow of control fluid is interrupted by the inlet valve 52 which is moved to the closed position, separating control cylinder 34 from the pressure source 24.

Figure 2:
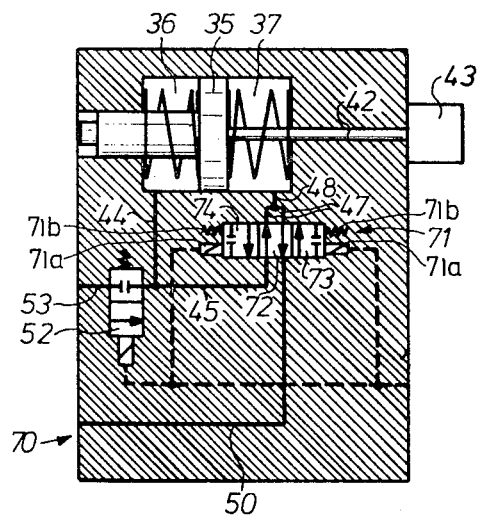
FIG. 2 is a schematic sectional view illustrating a second embodiment of the invention.

Only the control unit 71 is shown in FIG. 2, while the operating valve means 10 is omitted for the sake of simplicity, but it is provided in the same manner and position as shown in FIG. 1. In the embodiment of FIG. 2, the distributing valve means is not composed of two distributing valves each of which is movable between open and closed positions, but the distributing valve means 71 has a valve slide movable between a neutral position 72, and two control positions 73 and 74, as schematically indicated in FIG. 2. The cylinder of the distributing valve means 71 has two ports 47 connected by a conduit 48 with the second chamber 37, another port connected by inlet conduit 45 with the inlet valve 52, and the fourth port connected with the outlet conduit 50. Electromagnetic means 71a shift the slide of the distributing valve means 71 between the neutral position 72 and the control positions 73, 74, while springs 71b biass the distributing valve slide to the illustrated neutral position.

In the first control position 73, the first pressure chamber 36 and the second pressure chamber 37 are connected with each other, while the second pressure chamber 37 is disconnected from the outlet conduit 50, 14. This first control position 73 corresponds to opening of the first distributing valve 46, and closing of the second distributing valve 49, in the first embodiment of the invention.

The second control position 74 corresponds to the closed position of the first distributing valve 46 and the open position of the second distributing valve 49 in the embodiment of FIG. 1 by which a movement of the differential control piston 35 is obtained. The inlet valve 52 is operated between the open and closed positions as explained with reference to FIG. 1.

While the apparatus of the embodiment of FIG. 2 can only be operated in the above explained manner due to the position of a single distributing valve means 71, the embodiment of FIG. 1 permits other combinations of the open and closed positions of the distributing valves 46, 49 and of the inlet valve 52, since the distributing valves 46 and 49 can be operated independently of each other.

Consequently, the first distributing valve 46 can be used for hydraulically blocking the differential control piston 35 while the slider valve body 18 is displaced out of its neutral position. In the left or right end positions of the control piston means 35 and of the slider valve body 18, the closing of the inlet valve 52 may be omitted, and inlet valve 52 remain in the open position, since the pressure acting on the differential control piston means 35 holds the same and thereby the slider valve body 18 in the respective end position. It is advantageous to operate the valves of FIG. 1 in such a manner that the manually operated means 31 can be used when the desired value representing device 57 is in the zero position. In this manner, upon failure of electronic control means 56, or upon a disturbance in the hydraulic circuit, the slider valve body 18 can be directly manually set to the required position.

Furthermore, the springs 39 and 40 can be used for returning the differential control piston means 35 from its end positions to the neutral position, so that the required control flow of fluid is particularly small. During a movement to the right of the differential control piston means 35, from its left end position, the inlet valve 52 can be closed, and the first and second distributing valves 46, 49 opened. Superfluous pressure fluid flows during this movement from the second chamber 37 through the second distributing valve 49 into the outlet conduit 14. During a movement of the differential control piston means 35 out of its right end position to the left, fluid can be sucked from the outlet conduit 14 into the chamber 37.

The apparatus of the invention is not limited to a structure in which the operating valve means 10 with slider valve body 18 blocks the hydraulic consumer motor 29 in its neutral position. The apparatus can also be constructed in such a manner that the piston 30 floats in the neutral position, or a so-called Y-circuit for rapid transverse can be applied for consumer motors having a differential piston.

It will be understood that each of the elements described above, or two or more together, may also find a useful application in other types of hydraulic valve control apparatus differing from the types described above.

While the invention has been illustrated and described as embodied in a differential control piston means operated by an inlet valve and distributing valve means to make controlled movements to end positions and intermediate positions, it is not intended to be limited to the details shown since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims.

We claim:

1. Hydraulic valve control apparatus comprising a hydraulic motor including a control cylinder, and a control piston means forming in said control cylinder first and second chambers; inlet conduit means; a source of pressure fluid connected with said inlet conduit means; outlet conduit means communicating with a low pressure area; distributing valve means having a neutral position for connecting said first and second chambers with said outlet conduit means, and a plurality of control positions for connecting said inlet and outlet conduit means with selected chambers of said first and second chambers; and inlet valve means in said inlet conduit means upstream of said distributing valve means having a closed position and an open position in which pressure fluid flows at least partly through said distributing valve means to said first and second chambers for operating said control piston means whereby movement of said control piston means can be started and stopped by operation of said inlet valve means.

2. Apparatus as claimed in claim 1 wherein said control piston means has effective surfaces of unequal size bounding said first and second chambers, the smaller effective surface bounding said first chamber; and wherein said inlet conduit means is connected with said first chamber downstream of said inlet valve means.

3. Apparatus as claimed in claim 2 further comprising spring means in said control cylinder for biassing said control piston means to a neutral position.

4. Apparatus as claimed in claim 1 wherein each of said distributing valve means and inlet valve means includes electromagnetic operating means; and further comprising an actual position representing device for sensing the actual position of said control piston means, and including means for generating a signal representing the actual position of said control piston means; a desired position representing device settable to a desired position of said control piston means and including means for generating a signal representing the desired position of said control piston means; and electric control means for comparing said signals and connected with said electromagnetic operating means for operating said distributing valve means and said inlet means until the actual position of said control piston means coincides with the desired position of said control piston means.

5. Apparatus as claimed in claim 1 wherein said inlet valve means has an inlet port and outlet port disconnected in said closed position and connected in said open position; wherein said inlet valve means includes operating means for moving said inlet valve means between said closed and open positions, said operating means including electromagnetic means; wherein said inlet valve means moves to said closed position and open position, respectively, when said electromagnetic means is de-energized and energized, respectively.

6. Apparatus as claimed in claim 1 wherein said distributing valve means includes first and second distributing valves, each distributing valve having an open position and a closed position, said first distributing valve connecting in said open position said first and second chambers, and said second distributing valve connecting in said open position said second chamber with said outlet conduit means.

7. Apparatus as claimed in claim 6 wherein each of said first and second distributing valves includes electromagnetic means for moving, when energized, the respective distributing valve to said closed position thereof.

8. Apparatus as claimed in claim 6 wherein said first chamber has an effective surface smaller than the effective surface of said second chamber.

9. Apparatus as claimed in claim 1 wherein said distributing valve means includes a valve cylinder having an inlet port connected with said inlet conduit means, an outlet port connected with said outlet conduit means, and two ports connected with each other and with said second chamber, and a distributing valve slide in said valve cylinder having said neutral position and first and second control positions, said distributing valve slide connecting in said neutral position said connected ports with said inlet and outlet conduit means, and connecting in said first and second control positions said second chamber with said inlet and outlet conduit means, respectively.

10. Apparatus as claimed in claim 9 wherein said distributing valve means include spring means in said valve cylinder urging said distributing valve slide to said neutral position.

* * * * *